United States Patent [19]

Brodsky et al.

[11] 4,452,855
[45] Jun. 5, 1984

[54] REINFORCING PROCESS

[75] Inventors: Gregory I. Brodsky, Wilmington; Bernard J. Scheve, Heritage Park, both of Del.

[73] Assignee: Hercules Incorporated, Wilmington, Del.

[21] Appl. No.: 465,850

[22] Filed: Feb. 11, 1983

[51] Int. Cl.$^3$ ............................................. B32B 25/10
[52] U.S. Cl. ................................ 428/290; 152/330 R; 152/359; 156/910; 524/168
[58] Field of Search ................... 524/168; 152/330 R, 152/359; 156/910; 428/290

[56] References Cited

U.S. PATENT DOCUMENTS

| | | | |
|---|---|---|---|
| T102,904 | 4/1983 | Wenghoefer | 156/110 |
| 3,287,367 | 11/1966 | Newburg | 260/349 |
| 3,616,199 | 10/1971 | Breslow | 161/231 |

*Primary Examiner*—James J. Bell
*Attorney, Agent, or Firm*—Jeffrey F. Craft

[57] ABSTRACT

The adhesion of fibrous polymeric aromatic amide reinforcing material to rubber stock is improved by treating the fibrous material with an aliphatic sulfonylazide having the general formula $R(Cl)_x(SO_2N_3)_y$, where R is an aliphatic or cycloaliphatic hydrocarbon radical containing at least 5 carbon atoms, y is from about 1 to about 4 and x is from 0 up to about 2y; heating the treated fibrous material at a temperature and for a period of time sufficient to decompose substantially all the sulfonylazide groups; then coating the resulting material with an adhesive; and finally, embedding the coated material into rubber stock which is then vulcanized. In a preferred embodiment, a fibrous material which has been treated with an aliphatic sulfonylazide conforming to the above formula and where y is greater than 1, is heated at a temperature and for a period of time sufficient to decompose only from about 35 to about 75% of the sulfonylazide groups, then the treated material is coated with an adhesive and embedded into rubber stock which is then vulcanized. Also disclosed are the vulcanized products thus produced.

7 Claims, No Drawings

REINFORCING PROCESS

BACKGROUND OF THE INVENTION

1. Field of the Invention

This invention relates to a process of improving the adhesion of fibrous polymeric aromatic amide reinforcing material to rubber stock and to the products so produced. In particular, this invention relates to a process of improving the adhesion of polymeric aromatic amide fiber, including yarn, fabric and cord, to rubber stock by pretreating the fiber with an aliphatic sulfonylazide and to the vulcanized rubber products so produced.

2. Description of the Prior Art

It is known to reinforce rubber products with various synthetic fibers such as polyester, rayon, nylon, and polymeric aromatic amide. It is also known that polymeric aromatic amide fibers are particularly advantageous reinforcement materials because of their high tensile strength and modulus. Unfortunately, the adhesion of untreated polymeric aromatic amide fibers to rubber stock is low.

It is further known that polysulfonylazides are useful crosslinking agents. For example, U.S. Pat. No. 3,287,376 teaches that aliphatic polysulfonylazides are useful as crosslinking agents for polyolefins. U.S. Pat. No. 3,616,199 and U.S. Pat. No. 3,203,937 teach the use of certain polysulfonylazides as tire cord adhesives. None of these patents suggests in any way the excellent results obtained by using an aliphatic sulfonylazide with a polymeric aromatic amide reinforcing material.

SUMMARY OF THE INVENTION

It has now been found that the adhesion of fibrous polymeric aromatic amide reinforcing material to rubber stock is improved by treating said fibrous material with an aliphatic sulfonylazide having the formula $R(Cl)_x(SO_2N_3)_y$ where R is an aliphatic or cycloaliphatic hydrocarbon radical containing at least 5 carbon atoms, y is from about 1 to about 4 and x is from 0 up to 2y; then heating the treated material at a temperature and for a period of time sufficient to decompose substantially all the sulfonylazide groups; then coating the resulting material with an adhesive; and finally, embedding the coating material into rubber stock which is then vulcanized. In a preferred embodiment, an aliphatic sulfonylazide conforming to the above formula and where y is greater than 1 is used to treat the fibrous material. The treated material is then heated at a temperature and for a period of time sufficient to decompose only from about 35 to about 75% of the sulfonylazide groups; then the resulting fibrous material is coated with an adhesive; and finally, it is embedded into rubber stock which is then vulcanized.

DETAILED DESCRIPTION OF THE INVENTION

It has been found that certain aliphatic and cycloaliphatic hydrocarbon sulfonylazides can be used to impart improved adhesion between fibrous polymeric aromatic amide reinforcing material and rubber stock. The adhesion is superior to that which results from the use of other azido compounds such as aromatic sulfonylazides and azidoformates.

The aliphatic sulfonylazides used to treat a fibrous polymeric aromatic amide reinforcing material are aliphatic sulfonylazides having the general formula $R(Cl)_x(SO_2N_3)_y$ where R is an aliphatic or cycloaliphatic hydrocarbon radical containing at least 5 carbon atoms, y is from about 1 to about 4 and x is from 0 up to 2y. Typically R can be selected from aliphatic hydrocarbon radicals such as pentyl, hexyl, heptyl, octyl, decyl, dodecyl, tridecyl, octadecyl, paraffin waxes, etc. and from cycloaliphatic hydrocarbon radicals such as cyclopentyl, cyclohexyl, cyclooctyl, etc., and alkyl substituted derivatives thereof.

Exemplary sulfonylazides are dichlorodecane disulfonylazide, trichlorooctadecane trisulfonylazide, chlorocyclohexane disulfonylazide, dodecane disulfonylazide, chlorotridecane sulfonazide, octachlorooctadecane tetrasulfonyl azide and sulfonylazides of chlorosulfonated mineral oil and paraffin wax.

The polymeric aromatic amide fibers which are advantageously treated with aliphatic polysulfonylazides are totally aromatic polyamides such as Kevlar TM sold by E. I. DuPont de Nemours and Company. The reinforcing material can be in any form when treated, such as fabric, yarn, cord, etc. However, as a practical matter, the material to be treated generally will have been previously twisted or plied into tire cord. Various methods for the preparation of polymeric aromatic amide tire cord are well known to those skilled in the art.

The first step in the process of this invention is the treatment of polymeric aromatic amide fiber with an aliphatic sulfonylazide. This is accomplished by contacting the fiber with an aliphatic sulfonylazide compound as for example, by dipping, spraying, brushing, or running it over a coated roll with a dispersion or solution of the aliphatic sulfonylazide in a suitable liquid. Exemplary of suitable liquids are methylene chloride, trichloroethylene, methyl ethyl ketone, benzene and toluene. Water can also be used if the aliphatic sulfonylazide is applied as an aqueous suspension, emulsion or dispersion.

Various amounts of the aliphatic sulfonylazide can be used. The optimum amount employed will depend upon the extent of treatment desired and the specific sulfonylazide used. In general, the amount added, based on the weight of the fiber, is from about 0.1 to about 5.0%, preferably from about 0.5 to about 1.0%.

In the next step of the process, the thus treated fiber is heated to a temperature and for a period of time sufficient to decompose substantially all of the sulfonylazide groups. In a preferred embodiment the polymeric aromatic amide fiber is treated with a compound having more than one sulfonylazide per molecule and then heated to a temperature and for a period of time sufficient to decompose only from about 35 to about 75%, preferably about 50%, of the sulfonylazide groups. The exact temperature and period of time will depend on the half life of the specific aliphatic sulfonylazide used. In general, the temperature will be between about 120° C. and about 250° C. At temperatures below 120° C. decomposition is too slow to be practical while at temperatures much above 250° C. the decomposition will be too fast to control. The time required will generally be in the range of from about 1 second to about ten minutes.

Next, the resulting material is coated with a coating or adhesive, which is compatible with the rubber stock in which the fibrous reinforcing material is to be embedded. Such coatings are well known to those skilled in the art. The adhesive is generally a mixture of a resorcinol-formaldehyde resin and a vinylpyridine polymer latex. The mole ratio of resorcinol to formaldehyde in the resin can be varied between about 1:1.02 to about 1:5. The resin will generally be aged for a period of from about 0.5 to about 6 hours before mixing with the vinylpyridine polymer latex. The aging can be carried out at room temperature or elevated temperatures. In all cases the exact selection of the polymer latex components will be made to achieve compatibility with the rubber used in the final fiber-to-rubber composite. For use with natural rubber and styrene-butadiene rubber the vinylpyridine polymer latex will preferably be a terpolymer of a vinylaryl monomer, such as styrene, a diene monomer, such as butadiene, and a vinylpyridine monomer. The rubber polymer latex is admixed with the resorcinol-formaldehyde resin in ratios of between about 2:1 and about 5:1. Following the admixing of the two ingredients the pH will generally be adjusted to about 9.5 to about 10.5 using a base such as ammonium hydroxide.

The adhesive is applied to the treated fibrous material by conventional means such as dipping, spraying, running the material over a coated roll, or other well known procedures. The adhesive will amount to from about 5% to about 12% by weight of the material. The coated material will then be dried and cured for a short time such as from about 1 to about 10 minutes at a temperature of between about 120° C. and about 250° C.

In the final step the coated material is embedded in the vulcanizable rubber stock and the rubber stock is then vulcanized. Conventional vulcanization temperatures in the order of from about 125° C. to about 175° C. are used. The rubber stock into which the coated material is embedded includes natural rubber and synthetic rubbers such as styrene-butadiene rubber, ethylene propylene diene terpolymer rubbers, ethylene propylene copolymer rubbers, polybutadiene, polyisoprene, poly(propylene oxide) elastomers and mixtures or blends thereof with suitable fillers, pigments, antioxidants, and crosslinking (i.e., vulcanizing) agents such as sulfur, dicumyl peroxide, and the like.

The following examples will serve to illustrate the invention, all parts and percentages being by weight unless otherwise indicated.

EXAMPLE A

To a flask equipped with a stirrer, thermometer, condenser cooled with dry ice, gas inlet and cooling bath was added 172 grams of n-dodecane, and 1 liter of methylene chloride. After cooling to 10° C., sulfur dioxide was fed in to the stirred solution at a rate of 750 ml. per minute for 2½ hours. Then the flask was irradiated with two 140 watt ultraviolet lights and chlorine was fed at a rate of 500 ml. per minute while maintaining the temperature at 6°-10° C. Both gases continued to be fed for two hours. At the end of this period, the radiation was discontinued. The flask was swept with nitrogen and the temperature was allowed to rise to room temperature. The methylene chloride was removed by vacuum distillation and dodecane polysulfonylchloride recovered. Analysis indicated the presence of two sulfonylchloride groups per molecule.

One hundred eighty-nine grams of the dodecane polysulfonylchloride, dissolved in 475 ml. of acetone, was cooled to 21° C. and with rapid stirring 100 grams of sodium azide dissolved in 475 ml. of water, was added dropwise over a two-hour period. The temperature was maintained below 30° C. Stirring was continued for one hour and the mixture was heated slowly to reflux temperature for one hour, then allowed to cool with continued stirring over a 12-hour period. The reaction mixture separated into two layers. 250 ml. of methylene chloride was added to the organic layer. It was washed three times with an equal volume of distilled water. The separated organic layer was dried over anhydrous magnesium sulfate and filtered through a fritted glass funnel. The solvent was removed under vacuum at 50°-60° C., finally at a pressure of 0.1-0.2 torr. The resulting dodecane disulfonylazide weighed 178 grams and analyzed 1.6% chlorine, 22.6% nitrogen and 17.6% sulfur, which indicates the presence of about two sulfonylazide groups and about 0.2 chlorine atoms per molecule.

EXAMPLE B

Two hundred lbs. of a narrow boiling aliphatic hydrocarbon mixture containing primarily isomers of tridecane and 400 lbs. ethylene dichloride were charged into a 100 gallon glass lined reactor. This solution was saturated with 50 lbs. of sulfur dioxide. A 600 watt ultraviolet lamp shining through a 3-inch diameter pyrex glass covered manhole was used to irradiate the mixture. Three hundred sixteen lbs. of chlorine and 540 lbs. of sulfur dioxide were introduced into the irradiated mixture over a 63.5 hour period, the reaction mixture being maintained at a temperature of 20°-25° C. The solvent was then removed from the product by evaporation under 100 torr pressure to a final temperature of 61° C.

One hundred twenty-five lbs. of the chlorosulfonated aliphatic hydrocarbon and 125 lbs. of methyl isobutyl ketone were charged to an agitated 100 gallon glass lined reactor. A solution of 36 lbs. sodium azide and 2.1 lbs. disodium phosphate buffer in 144 lbs. water were added over a period of one hour, the temperature being maintained at 50° C. Then 62.5 lbs. of methanol was added and the agitation continued for 10 hours. The agitation was discontinued and after phase separation the lower aqueous layer was drained from the kettle. One hundred lbs. of water and 30 lbs. of methanol were added and mixed with the organic layer for ½ hour. The aqueous layer was discarded and the organic layer filtered through a 1 micron cartridge filter. After evaporation of the solvent, the resulting alkane sulfonylazide analyzed 13.4% nitrogen, 8.9% sulfur and 11.7% chlorine, which showed the product contained about one sulfonylazide group and one chlorine atom per molecule.

EXAMPLE 1

A 1500 denier three ply aromatic polyamide tire cord was dipped in a 0.5% toluene solution of the polysulfonylazide of Example A. The cord was then dried at 105° C. for 1 minute and found to contain 0.45% of the polysulfonylazide compound by weight. The cord was then heated at 205° C. for 66 seconds, the time and temperature being chosen to decompose 75% of the sulfonylazide groups. The so treated cord was then dipped in a 25% solids mixture of a resorcinol-formaldehyde resin (mole ratio of 1.6:1 formaldehyde to resorcinol) and a vinylpyridine latex, the weight ratio of latex to resin being 4.9:1, the pH of the mixture being adjusted to 10.2 with ammonium hydroxide. The cord was then dried at 105° C. for 1 minute and heated at 230° C. for 1 minute to cure the resin. The total pickup of polysulfonylazide, resin and latex was 7.5% of the weight of the cord.

A typical natural rubber belt stock with the following components was compounded on a two roll mill and cut into 1-inch strips 60 mils thick.

| Natural rubber | 100 parts |
| --- | --- |
| Carbon black | 60 |
| Stearic acid | 2 |
| Zinc oxide | 5 |
| Ester plasticizer | 5 |
| Phenolic antioxidant | 1 |
| Tackifier | 3 |
| Hydrocarbon accelerator | 0.7 |
| Sulfur | 3.1 |
| Scorch inhibitor | 0.3 |

The adhesion of the treated cord to cured rubber was determined by preparing samples in which three portions of the treated cord were placed between two layers of the compounded rubber strips such that each contacted the rubber over the 1-inch width of the rubber and extended outside the rubber. The free ends of two of the cords were on one side of the rubber strip and that of the third being on the opposite side. The cords were ⅛-inch apart. The composition was cured in a platen press heated to 160° C. for 20 minutes under a pressure of 500 psi. The samples were stored 16 hours after curing before testing.

The samples were tested by holding the two cords on one side of a sample in one clamp of a tensile tester and the cord extending from the other side of the sample in the other clamp of the tester and measuring the force to pull the single cord out of the vulcanized rubber sample, the tensile tester being operated at a rate of 12 in./min. Tests were made at room temperature and at 100° C. Tests were also carried out on tire cords prepared under the same conditions except that no sulfonylazide was employed. Results are shown in Table I.

TABLE I

| Polysulfonylazide | Adhesive Force lbs. | |
| --- | --- | --- |
| % Pickup | R.T. | 100° C. |
| 0 | 119 | 61 |
| 0.45 | 170 | 111 |

EXAMPLE 2

The aromatic polyamide tire cord used in Example 1 was treated and tested in the same manner as in Example 1 except that the sulfonylazide was that described in Example B and it was applied as a water emulsion containing 19.9% of the treating agent. After drying, the cord contained 1% of the sulfonylazide by weight. The cord was heated at 230° C. for one minute causing essentially complete decomposition of the sulfonylazide. The adhesive force obtained on testing the sample at room temperature was 137 lbs.

EXAMPLE 3

The aromatic polyamide tire cord used in Example 1 was treated and tested as described in Example 1 except that the sulfonylazide of Example B was used, applied as a 43.9% solution in methyl isobutyl ketone. The dried cord contained 1.5% of the sulfonylazide and it was heated at 230° C. for one minute to substantially decompose all the sulfonylazide groups. The adhesive force obtained on testing the sample was 146 lbs. compared with a value of 117 lbs. obtained for a control prepared under the same conditions except that no sulfonylazide was employed.

What we claim and desire to protect by Letters Patent is:

1. In a process for adhering fibrous polymeric aromatic amide reinforcing material to rubber stock by coating the reinforcing material with an adhesive, embedding the coated material into rubber stock and then vulcanizing, the improvement of first treating said fibrous material with an aliphatic sulfonylazide having the formula $R(Cl)_x(SO_2N_3)_y$ where R is an aliphatic or cycloaliphatic hydrocarbon radical containing at least 5 carbon atoms, y is from about 1 to about 4 and x is from 0 to 2y and heating the thus treated fibrous material at a temperature and for a period of time sufficient to decompose substantially all the sulfonylazide groups.

2. The process of claim 1 wherein y is greater than 1 and the treated fibrous material is heated at a temperature and for a period of time sufficient to decompose from about 35 to about 75% of the sulfonylazide groups prior to coating with adhesive.

3. The process of claim 1 wherein the aliphatic sulfonylazide is chosen from the group consisting of dichlorodecane disulfonylazide, trichlorooctanedecane trisulfonylazide, chlorocyclohexane disulfonylazide, dodecane disulfonylazide, chlorotridecane sulfonazide and sulfonylazides of chlorosulfonated mineral oil and paraffin wax.

4. The process of claim 2 wherein the aliphatic sulfonylazide is dichlorododecane disulfonylazide.

5. The process of claim 1 wherein R is an aliphatic hydrocarbon radical containing 13 carbon atoms and x and y are both about 1.

6. A fibrous polymeric aromatic amide reinforcing material treated with an aliphatic sulfonylazide having the formula $R(Cl)_x(SO_2N_3)_y$ where R is an aliphatic or cycloaliphatic hydrocarbon radical containing at least 5 carbon atoms, y is from about 1 to about 4 and x is from 0 to up to about 2y.

7. A vulcanized rubber, reinforced with fibrous polymeric aromatic amide reinforcing material, said reinforcing material having been treated by heating with a small amount of an aliphatic sulfonylazide having the formula $R(Cl)_x(SO_2N_3)_y$ where R is an aliphatic or cycloaliphatic hydrocarbon radical containing at least 5 carbon atoms, y is from about 1 to about 4 and x is from 0 to about 2y.

* * * * *